(12) United States Patent
Jin Kim et al.

(10) Patent No.: US 12,589,505 B2
(45) Date of Patent: Mar. 31, 2026

(54) AUTONOMOUS PICKING AND TRANSPORT ROBOT

(71) Applicant: Yi Jin Kim, Walpole, MA (US)

(72) Inventors: Yi Jin Kim, Walpole, MA (US);
Liezhong Yan, Walpole, MA (US);
Huanchang Chen, Walpole, MA (US);
Suzhen Zhong, Walpole, MA (US);
Xingyun Jin, Walpole, MA (US)

(73) Assignee: Yi Jin Kim, Walpole, MA (US)

( * ) Notice: Subject to any disclaimer, the term of this patent is extended or adjusted under 35 U.S.C. 154(b) by 0 days.

(21) Appl. No.: 18/799,236

(22) Filed: Aug. 9, 2024

(65) Prior Publication Data

US 2025/0073914 A1      Mar. 6, 2025

Related U.S. Application Data

(60) Provisional application No. 63/579,402, filed on Aug. 29, 2023.

(51) Int. Cl.
| | |
|---|---|
| *B25J 11/00* | (2006.01) |
| *B25J 5/00* | (2006.01) |
| *B25J 9/16* | (2006.01) |

(52) U.S. Cl.
CPC ............. *B25J 11/008* (2013.01); *B25J 5/007* (2013.01); *B25J 9/1676* (2013.01)

(58) Field of Classification Search
CPC ......... B25J 11/008; B25J 5/007; B25J 9/1676
See application file for complete search history.

(56) References Cited

U.S. PATENT DOCUMENTS

| | | | |
|---|---|---|---|
| 9,156,394 B2 | 10/2015 | Toebes et al. | |
| 10,647,002 B2 | 5/2020 | Wagner et al. | |
| 2005/0131645 A1* | 6/2005 | Panopoulos ......... | G05D 1/0282 |
| | | | 701/472 |
| 2015/0104282 A1* | 4/2015 | Toebes .................... | B65G 7/00 |
| | | | 414/679 |

(Continued)

FOREIGN PATENT DOCUMENTS

| | | | | |
|---|---|---|---|---|
| CN | 215286573 U | * | 12/2021 | |
| JP | 2020040145 A | * | 3/2020 | ............... B25J 5/00 |

OTHER PUBLICATIONS

International Search Report and Written Opinion issued in corresponding International Application No. PCT/US2023/035205; mailed Feb. 2, 2024; 18 pgs.

*Primary Examiner* — Nhi Q Bui
(74) *Attorney, Agent, or Firm* — HAUPTMAN HAM, LLP

(57) ABSTRACT

An autonomous picking and transport robot. The autonomous picking and transport robot includes a mobile base, a storage component, and a mechanical robotic arm component, wherein the mobile base includes a suspension system for mitigating vibrational impact to the mobile base during movement of the mobile base on the plurality of wheel. The suspension system incudes fixed rods and swing rods, wherein one of the plurality of wheels is attached to the each of the swing rods. Compression springs absorb shock of the swing rods. A damping component includes a damping rod and a damping plate, wherein the damping plate reduces a vibration amplitude of a swing rod positioned within the damping plate in response to at least one of the plurality of wheels encountering an obstacle during movement of the mobile base.

16 Claims, 8 Drawing Sheets

(56) References Cited

U.S. PATENT DOCUMENTS

| | | | |
|---|---|---|---|
| 2017/0080571 A1* | 3/2017 | Wagner | B25J 9/1602 |
| 2021/0237554 A1* | 8/2021 | Bangalore Srinivas | B60K 17/356 |
| 2021/0339393 A1* | 11/2021 | Dan | B25J 5/007 |
| 2022/0002082 A1 | 1/2022 | Macdonald et al. | |
| 2022/0305641 A1* | 9/2022 | Murphy | B25J 9/046 |

* cited by examiner

AUTONOMOUS PICKING AND TRANSPORT ROBOT

RELATED APPLICATIONS

This application claims priority to U.S. Provisional Patent Application No. 63/579,402, titled "AUTONOMOUS PICKING AND TRANSPORT ROBOT" and filed on Aug. 29, 2023, which is incorporated herein by reference in its entirety.

BACKGROUND

Machines have been assisting human workers with repetitive tasks for many years. Early examples include conveyor belts and forklifts. Due to demand driven by consumer spending, transportation of goods by land, sea, and air has increased. Warehousing has also experienced significant growth due to increase in trade, resulting in a high volume of inventory relative to a number of workers in any given warehouse thereby pushing a drive for more efficient and sophisticated order fulfillment procedures.

To increase order fulfillment efficiencies, robot assisted technologies were developed. Early in the process, robot assistance allowed workers to move heavy objects, which decreased danger to workers and allowed such workers to focus on more detail-oriented tasks. Robotic arms that were able to move in the X and Y axes began to be used to grasp and move objects. Due to the precision and tirelessness, the robotic arm experienced widespread use in the automotive and other industries.

The introduction of automated storage and retrieval systems (AS/RS) to the warehousing industry enabled items to be stored and retrieved in warehouses. AS/RSs allowed workers to remain at their workstations when packing orders rather than searching shelves for a particular item. A robot retrieves goods while the worker continues packing other items. This saved time for the distribution operation and continued the trend of keeping employees out of potentially dangerous situations. The exponentially rising popularity of online shopping has exacerbated the need for robots that can anticipate where human workers will need help and respond accordingly. Computers control most robotic functions using artificial intelligence embedded therein thereby removing the steps used to give a robot a command.

In many real-world application scenarios, material handling robots work in the same space as human workers. However, stability is a concerning issue due to the possibility of safety concerns, tip-overs, inaccurate item selection, and navigation problems.

SUMMARY

In at least embodiment, an autonomous picking and transport robot includes a mobile base, a storage component, and a mechanical robotic arm component, wherein the mobile base includes a suspension system for a plurality of wheels provided for locomotion, the suspension system mitigating vibrational impact to the mobile base during movement of the mobile base.

In at least one embodiment, a method for providing an autonomous picking and transport robot includes providing a mobile base, providing a storage component attached to the mobile base, providing a mechanical robotic arm component attached to the storage component, and providing a suspension system for a plurality of wheels used to enable the mobile base to move, wherein the suspension system mitigates vibrational impact to the mobile base during movement of the mobile base.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 3 is a bottom view of a base plate according to at least one embodiment.

DETAILED DESCRIPTION

Figure 1:
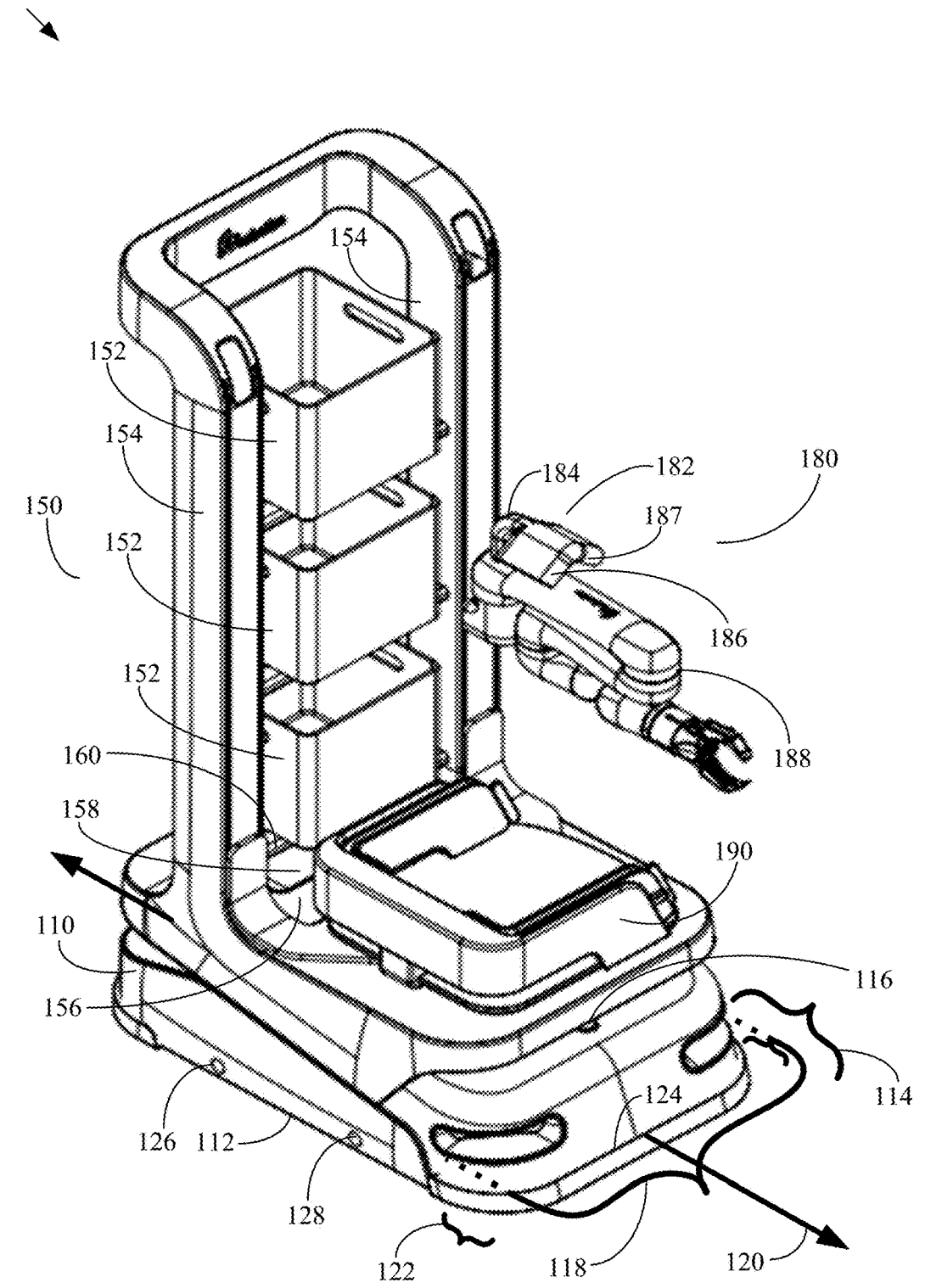
FIG. 1 illustrates an autonomous picking and transport robot according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

In at least one embodiment, An autonomous picking and transport robot includes a mobile base, a storage component, and a mechanical robotic arm component, wherein the mobile base includes a suspension system for mitigating vibrational impact to the mobile base during movement of the mobile base on the plurality of wheel. The suspension system incudes fixed rods and swing rods, wherein one of the plurality of wheels is attached to the each of the swing rods. Compression springs absorb shock of the swing rods. A damping component includes a damping rod and a damping plate, wherein the damping plate reduces a vibration amplitude of a swing rod positioned within the damping plate in response to at least one of the plurality of wheels encountering an obstacle during movement of the mobile base.

Embodiments described herein provide method that provides one or more advantages. For example, compared to the existing robots, embodiments described herein provide an autonomous picking and transport robot that allows for automated operation for picking up goods. Embodiments described herein provide fully automated operation of material handling robots, especially in warehousing environments with improved production efficiency.

FIG. 1 illustrates an autonomous picking and transport robot 100 according to at least one embodiment.

In FIG. 1, the autonomous picking and transport robot 100 includes a mobile base 110, a storage component 150, and a mechanical robotic arm component 180. The mobile base 110 supports the storage component 150 and the mechanical robotic arm component 180. The mobile base 110 is used to drive the transport robot to move forward, backward, left, and right on the ground.

The mobile base 110 includes a base plate 112 and a sensing device 114. The sensing device 114 acts as a navigation component and includes, at the front of the mobile base 110 on a symmetry axis 120, a LiDAR unit 116 and at least one RGBD camera unit 118, realizing the robot's mapping, positioning, navigation, and obstacle avoidance functions. A LIDAR unit is also able to be positioned at the back of the mobile base 110.

The at least one RGBD camera unit 118 is able to include a first set of RGBD cameras 118 located at the front of the mobile base 110. The first set of 2 RGBD cameras 118 is symmetrically arranged on either side of the advancing direction and aligned with the symmetry axis 120. A second set (not shown) is able to be located at the rear of the mobile base 110 symmetrically placed on either side of the symmetry axis 120. The mobile base 110 further includes a collision avoidance component 122, and a fall prevention components (sec fall prevention components 380, 382, 384, 386 in FIG. 3). The collision avoidance component 122 includes an anti-collision bar 124 and infrared sensors 126.

In at least one embodiment, the anti-collision bar 124 is fixed to the front outer casing of the mobile base 110. An anti-collision bar (not shown) is also able to be fixed to the rear outer casing of the mobile base 110. The infrared sensors 126 and ultrasonic radar 128 are mounted on the robot's lateral direction, serving to supplement the visual blind spots when the robot is moving sideways. The ultrasonic radar 128 is used to detect ground with drop-offs, preventing the robot from tipping over.

In FIG. 1, the storage component 150 is used for storing turnover boxes 152. The storage component 150 includes of side brackets 154 and a support plate assembly 156. In at least one embodiment, the side brackets 154 are hollow. A height of the support plate assembly 156 can be freely adjusted on the side brackets 154.

To ensure that the turnover box 152 is accurately positioned during the pulling out and pushing in processes, and to prevent the turnover box 152 on the support plate assembly 156 from sliding off during operation, the support plate 158 of the support plate assembly 156 has corresponding slots 160 designed to align with the turnover box 152. For example, slots 160 are made on the support plate 158, while the bottom of the turnover box 152 includes shaped protrusions (not shown), and the slots 160 are designed to receive the shaped protrusions of the turnover box 152. Additionally, to ensure that the turnover box 152 is able to slide easily on shelves or support plate 158, the turnover box 152 is made of plastic material, possessing inherent self-lubricating properties.

The mechanical robotic arm component 180 includes an RGBD component 182. The Red-Green-Blue and Depth (RGBD) component 182 includes an RGBD component bracket 184 and at least two RGBD cameras 186, 187. The RGBD component bracket 184 is fixed on the side brackets 154 of the storage component 150 and moves up and down together with the robotic arm 188.

A first RGBD camera 186 is oriented obliquely downward towards a tote 190 attached to the storage component 150 for holding the turnover box 152 obtained from the support plate 158 or from shelves, and its field of view (FOV) precisely covers the goods inside the tote 190. A second RGBD camera 187 is oriented outwards towards a shelf, and its field of view (FOV) precisely covers the goods inside a tote on the shelf (not shown).

The mechanical robotic arm component 180 includes a robotic arm 188. When the autonomous picking and transport robot 100 is in a non-working state, the robotic arm 188 is in the folded state as shown in FIG. 1. In the folded state as shown in FIG. 1, the robotic arm 188 is within the coverage area of the mobile base 110 to avoid the robot arm 188 from hitting people or objects during movement of the autonomous picking and transport robot 100. At the same time, the joints of the robotic arm 188 are equipped with braking devices to ensure that the robotic arm 188 will not fall in response to the autonomous picking and transport robot 100 losing power to thereby ensure safety.

Figure 2:
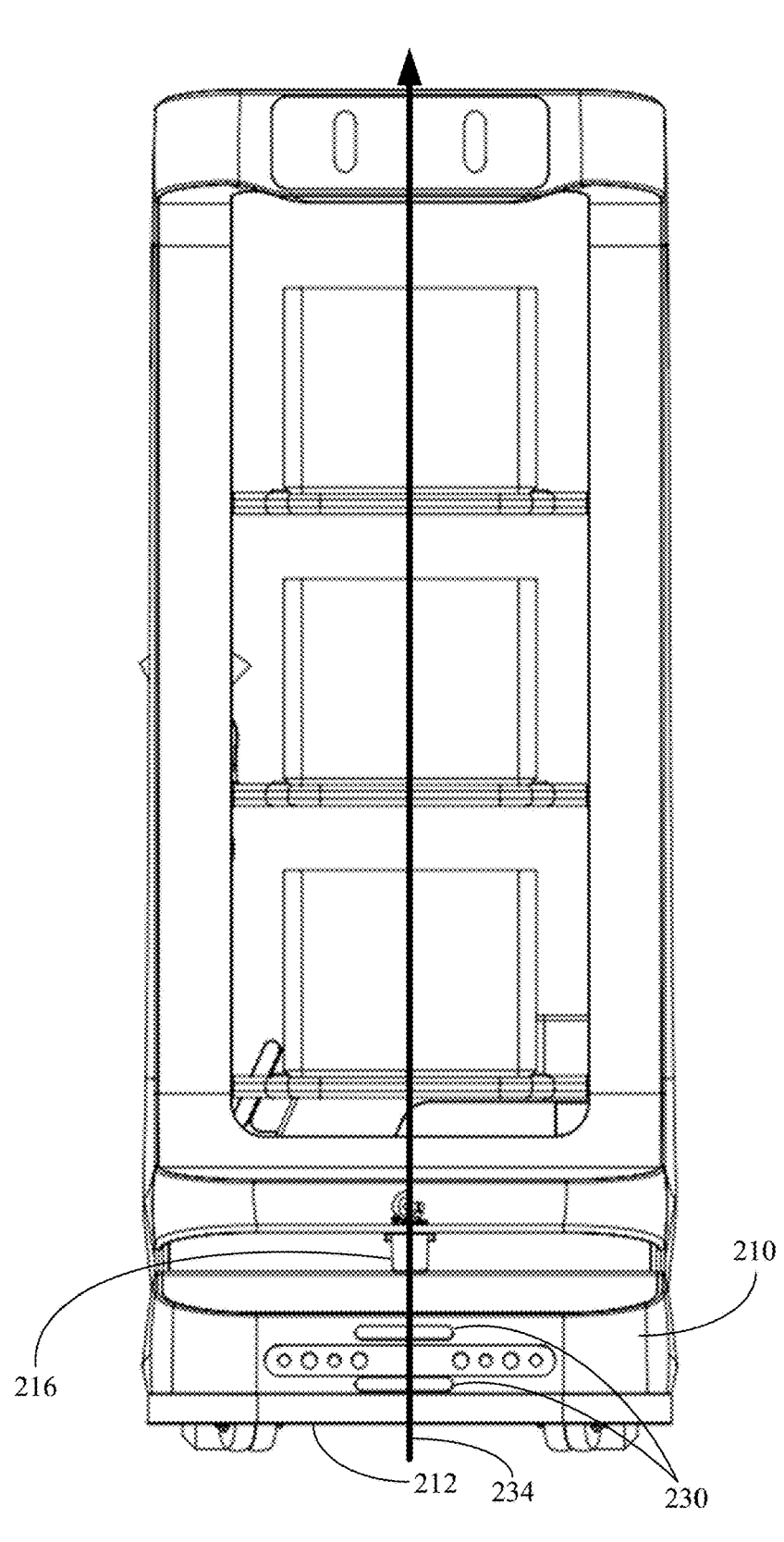
FIG. 2 is a rear view of an autonomous picking and transport robot according to at least one embodiment.

FIG. 2 is a rear view of an autonomous picking and transport robot 200 according to at least one embodiment.

In FIG. 2, the mobile base 210 includes a base plate 212. A rear LiDAR unit 116 is located on the mobile base 210. The mobile base 210 includes a charging device 230. The charging device 230 is positioned at the rear of the mobile base 210 and is located on a symmetrical axis 234. Under the navigation and positioning function of the navigation component 114 as shown in FIG. 1, the autonomous picking and transport robot 200 moves to a charging station that is configured to couple with the charging device 230. The autonomous picking and transport robot 200 is able to achieve precise alignment between a charging station and the charging device 230 to enable automatic charging. The charging device 230 is not limited to a specific form of charging. Those skilled in the art understand that embodiments of the charging device are able to support both wireless charging and wired charging mechanisms.

Figure 3:
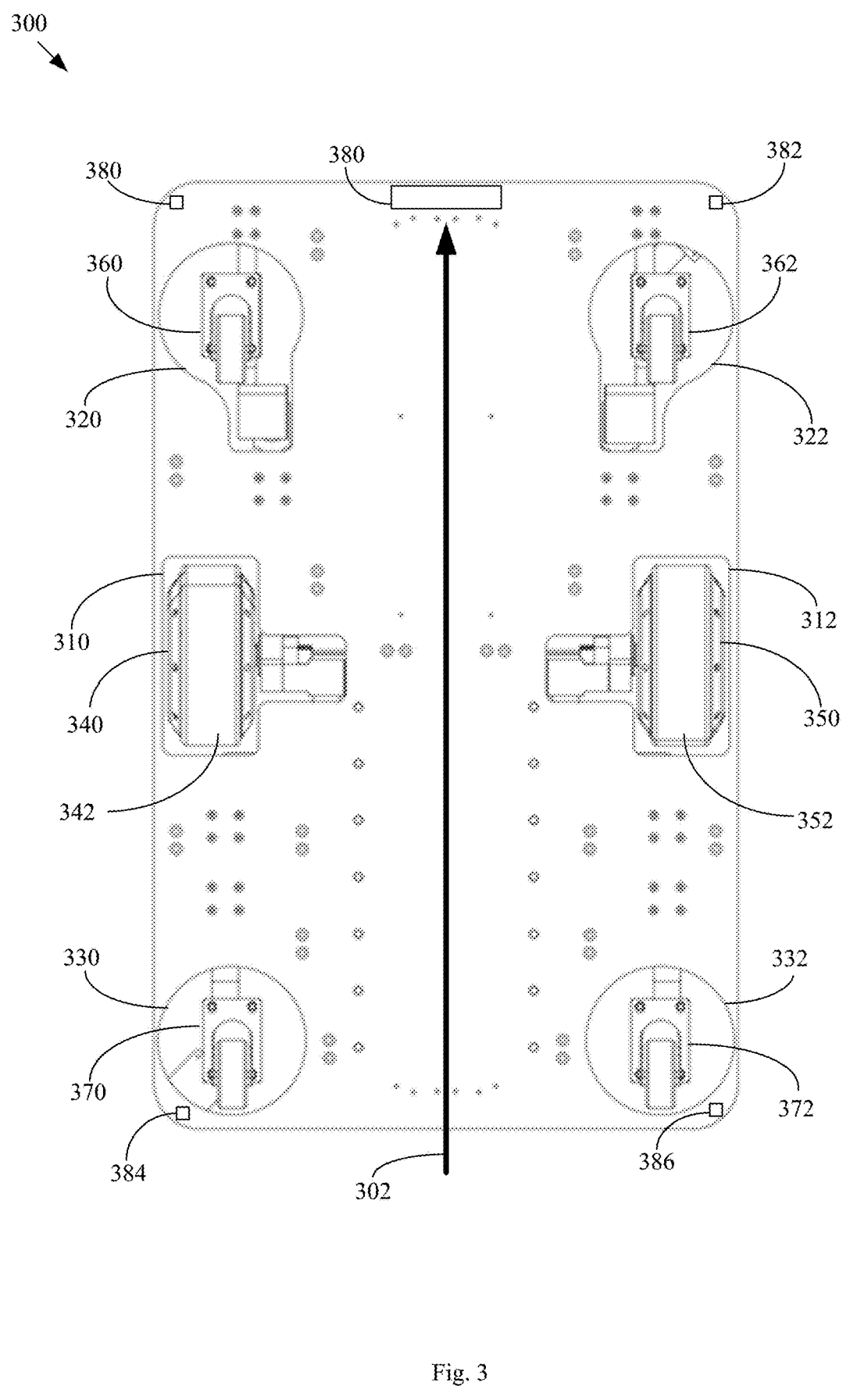

FIG. 3 is a bottom view of a base plate 300 according to at least one embodiment.

In FIG. 3, the base plate 300 is shown as a rectangular plate-like structure. Along the forward direction, there is a symmetrical axis 302. On the base, there are a first mounting port 310, a second mounting port 312, a third mounting port 320, a fourth mounting port 322, a fifth mounting port 330, and a sixth mounting port 332.

The mounting ports 310, 312, 320, 322, 330, 332 are recessed on the base plate 300, and the first mounting port 310 and second mounting port 312 are symmetrically distributed on opposite sides of the base plate 300 relative to the symmetrical axis 302. The third mounting port 320 and fourth mounting port 322 are symmetrically distributed on opposite sides of the base plate 300 relative to the symmetrical axis 302, and the fifth mounting port 330 and sixth mounting port 332 are symmetrically distributed on opposite sides of the base plate 300 relative to the symmetrical axis 302.

On the first mounting port 310 and the second mounting port 312, a first drive wheel component 340 and a second drive wheel component 350 are respectively mounted. In response to the drive wheel 342 within the drive wheel component 340 and the drive wheel 352 within the drive wheel component 350 operating at the same speed, the transport robot moves move forward or backward. In response to the drive wheel 342 within the drive wheel component 340 and the drive wheel 352 within the drive wheel component 350 operating at different speeds or directions, the transport robot veers towards one side, thus realizing the left or right turn of the transport robot.

The third mounting port 320 and the fourth mounting port 322 are used to mount a first passive wheel component 360 and second passive wheel component 362 respectively. The fifth mounting port 330 and the sixth mounting port 332 are used to mount a third passive wheel component 370 and fourth passive wheel component 372 respectively. The first passive wheel component 360, second passive wheel component 362, third passive wheel component 370, and fourth passive wheel component 372 support the base plate 300.

The base plate 300 further includes further includes collision avoidance components 380, 382, 384, 386 that are located at respective corners of the base plate 300. The collision avoidance components 382, 382, 384, 386 include sensors such as ultrasonic radar, infrared sensors, and the like.

Figure 4:
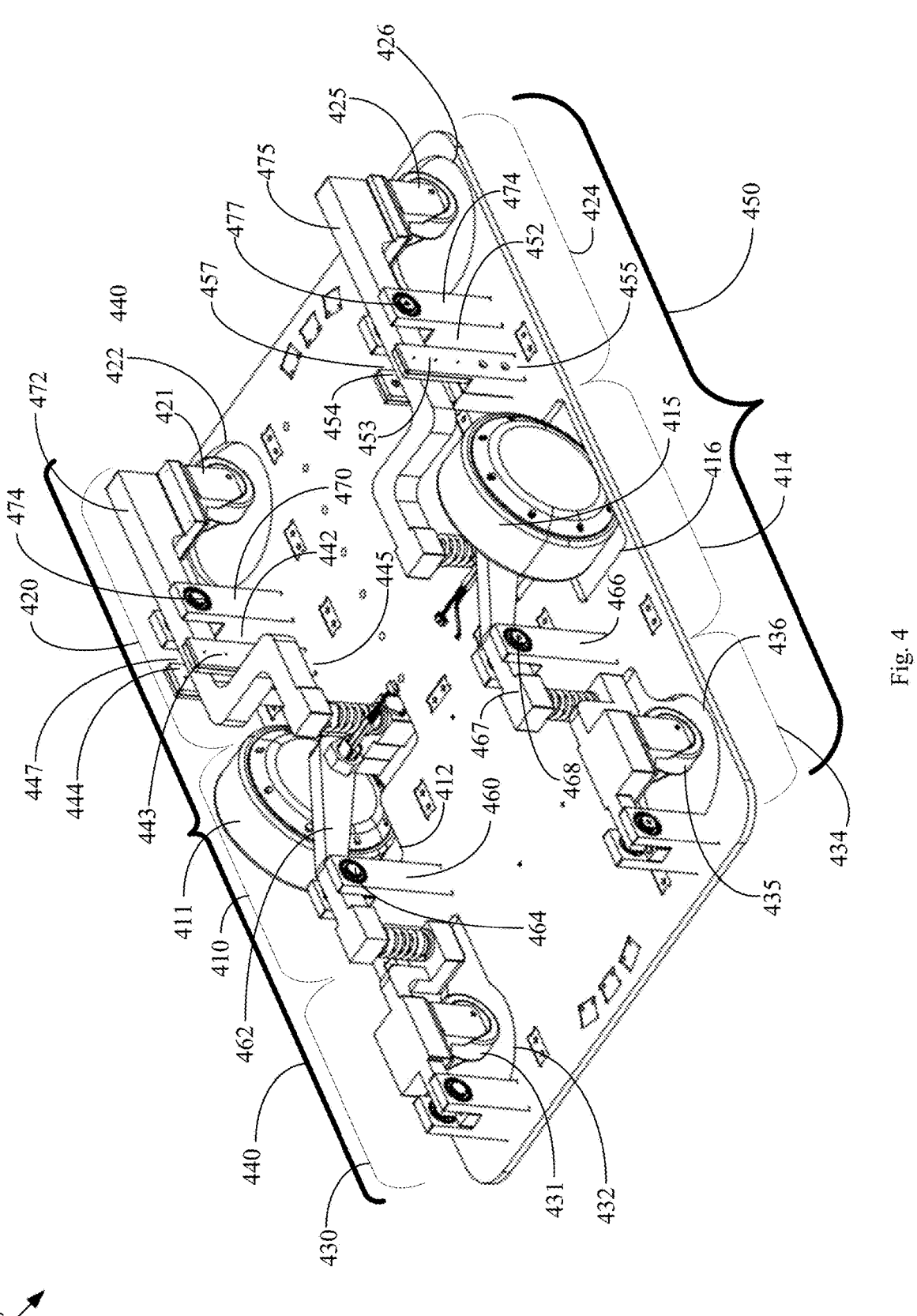
FIG. 4 illustrates a top view of a base plate according to at least one embodiment.

FIG. 4 illustrates a top view of a base plate 400 according to at least one embodiment.

In FIG. 4, a first drive wheel component 410 includes a first drive wheel 411 mounted in a first mounting port 412, and a second drive wheel component 414 includes a second drive wheel 415 mounted in a second mounting port 416. A first passive wheel component 420 includes a first passive wheel 421 mounted in a third mounting port 422, and a second passive wheel component 424 includes a second passive wheel 425 mounted in a fourth mounting port 426. A third passive wheel component 430 includes a third passive wheel 431 mounted in a fifth mounting port 432, and a fourth passive wheel component 434 includes a fourth passive wheel 435 mounted in a fourth mounting port 436.

A first suspension system 440 includes the first drive wheel component 410, first passive wheel component 420, third passive wheel component 430, and first damping component 442. A second suspension system 450 includes the second drive wheel component 414, second passive wheel component 424, fourth passive wheel component 434 and second damping component 452. First suspension system 440 and second suspension system 450 serve to mitigate impacts during activities such as climbing slopes, overcoming obstacles, and crossing ditches.

First drive wheel component 410 further includes a first fixed rod 460, a first swing rod 462, and the first drive wheel 411 mounted to the first swing rod 462. The first swing rod 462 is rotatably fixed to first fixed rod 460 at joint 464. Second drive wheel component 414 further includes a second fixed rod 466, a second swing rod 467, and the second drive wheel 415 mounted to the second swing rod 467. The second swing rod 467 is rotatably fixed to second fixed rod 467 at joint 468.

First passive wheel component 420 further includes a third fixed rod 470, a third swing rod 472, and the first passive wheel 421 mounted to the third swing rod 472. The third swing rod 472 is rotatably fixed to the third fixed rod 470 at joint 474. Second passive wheel component 424 further includes a fourth fixed rod 474, a fourth swing rod 475, and the second passive wheel 425 mounted to the fourth swing rod 475. The fourth swing rod 475 is rotatably fixed to fourth fixed rod 474 at joint 477.

The first damping component 442 is positioned between first drive wheel component 410 and the first fixed rod 470. First damping component 442 includes first damping rod 443 and a damping plate 444. One end 445 of the first damping rod 443 is fixedly mounted on the base plate 400 between the first drive wheel component 410 and the first fixed rod 460. The other end of the first damping rod 443 includes a groove 447. The damping plate 444 is fixed to the inner side of the groove 447 in the first damping rod 443, and the damping plate 444 acts to dampen vibration amplitude of third swing rod 472, which is coupled to the first drive wheel component 410 and first passive wheel 421.

The second damping component 452 is positioned between second drive wheel component 410 and the second fixed rod 474. Second damping component 452 includes second damping rod 453 and a damping plate 454. One end 455 of the second damping rod 453 is fixedly mounted on the base plate 400 between the second drive wheel component 414 and the fourth fixed rod 474. The other end of the second damping rod 453 includes a groove 457. The damping plate 454 is fixed to the inner side of the groove 457 in the second damping rod 453, and the damping plate 454 acts to dampen vibration amplitude of the fourth swing rod 475, which is coupled to the first drive wheel component 410 and second passive wheel 425.

In FIG. 4, one set of the damping components 442, 452 are shown. However, based on actual use, a second set of the damping components are able to be placed between the first drive wheel component 410 and the third fixed rod 470, and between the second drive wheel component and a fourth fixed rod 474.

Figure 5:
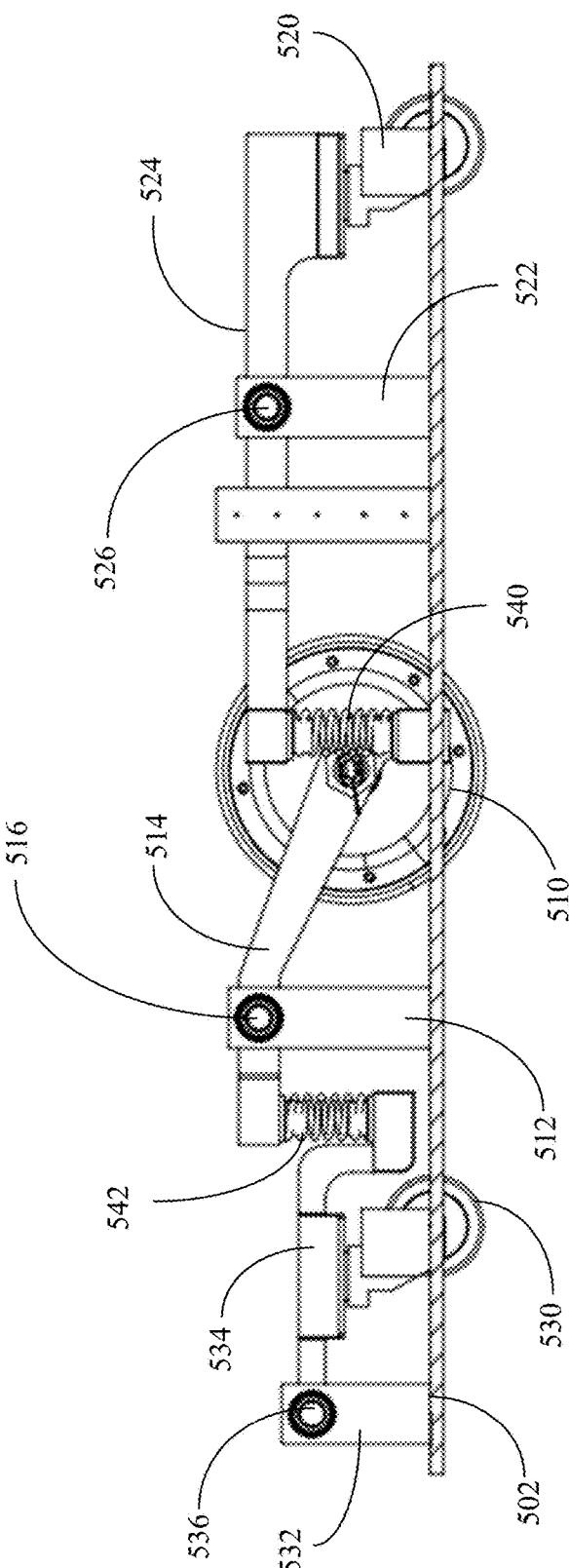
FIG. 5 is a side view of a suspension system according to at least one embodiment.

FIG. 5 is a side view of a suspension system 500 according to at least one embodiment.

In FIG. 5, suspension system 500 includes a drive wheel component 510, a first fixed rod 512, a first swing rod 514, wherein the drive wheel component 510 is mounted to the first swing rod 514. The first fixed rod 512 is securely installed on the base 502, and the first swing rod 514 is hinged to the first fixed rod 512 at the first hinge position 516. When the drive wheel component 510 crosses a ditch or an obstacle, the drive wheel component 510 is able to swing around the first hinge position 516 at a relatively small angle, either clockwise or counterclockwise, thereby reducing the vibrational impact on the base 502.

Suspension system 500 further includes a first passive wheel component 520, a second fixed rod 522, a second swing rod 524, wherein the first passive wheel component 520 is mounted to the second swing rod 524. First passive wheel component 520 includes a caster wheel. Second fixed rod 522 is securely installed on the base 502, and the second swing rod 524 is hinged to the second fixed rod 522 at a second hinge position 526. When crossing a ditch or an obstacle, the first passive wheel component 520, including the caster wheel, swings around the second hinge position 526 at a relatively small angle, either clockwise or counterclockwise, thereby reducing the vibrational impact on the base 502 during ditch crossing or obstacle overcoming.

Suspension system 500 further includes a second passive wheel component 530, a third fixed rod 532, a third swing rod 534, wherein the second passive wheel component 530 is mounted to the third swing rod 534. Second passive wheel component 530 includes a caster wheel. Third fixed rod 532 is securely installed on the base 502, and the third swing rod 534 is hinged to the third fixed rod 532 at a third hinge position 536. When crossing a ditch or an obstacle, the second passive wheel component 530, including the caster wheel, swings around the second hinge position 536 at a relatively small angle, either clockwise or counterclockwise, thereby reducing the vibrational impact on the base 502 during ditch crossing or obstacle overcoming.

The first swing rod 514 is connected to the second swing rod 524 using a first compression spring 540. The first swing rod 514 is connected to the third swing rod 534 using a second compression spring 542.

Figure 6:
FIG. 6 illustrates a lifting mechanism according to at least one embodiment.
Figure 6:
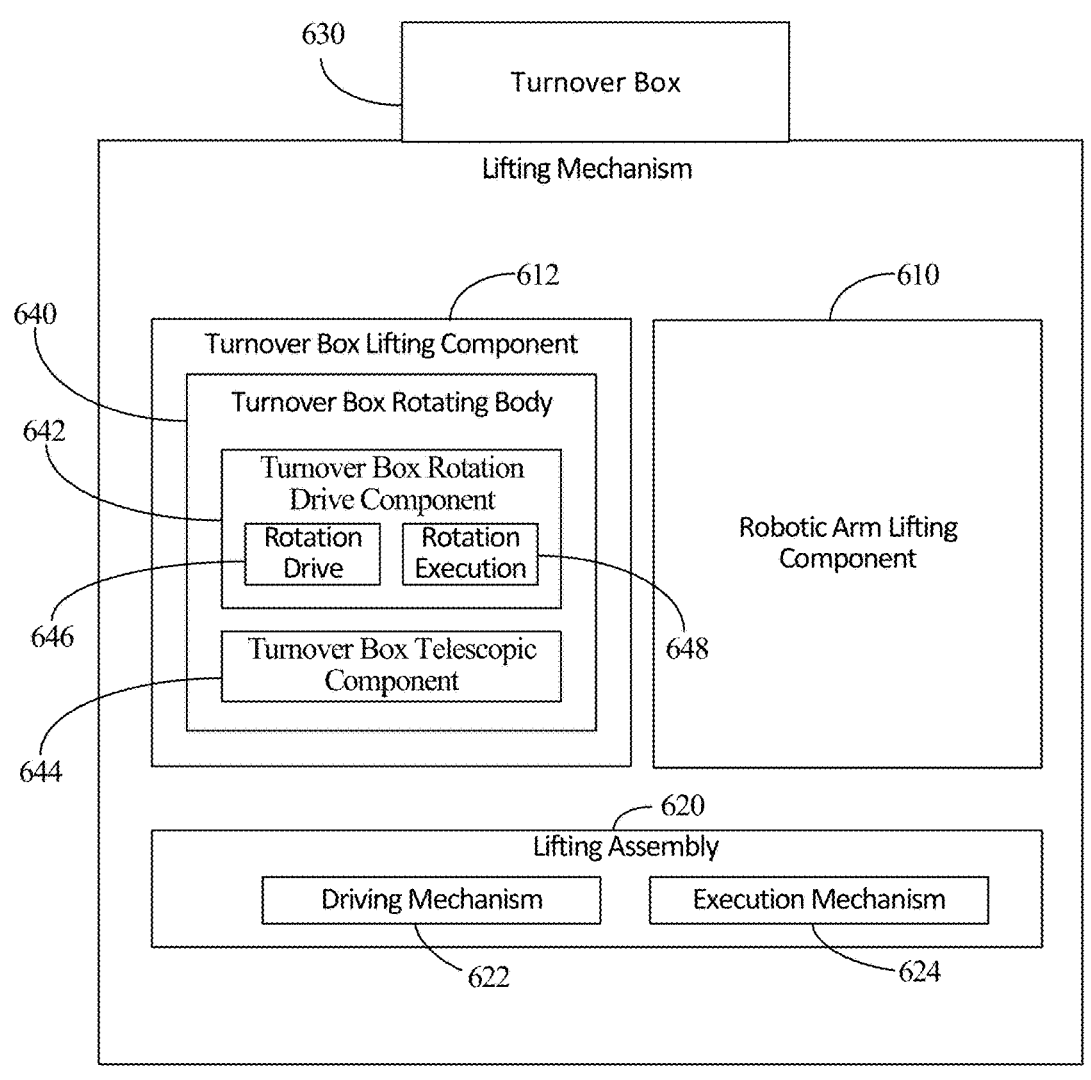

FIG. 6 illustrates a lifting mechanism 600 according to at least one embodiment.

In FIG. 6, the lifting mechanism 600 includes a robotic arm lifting component 610 and a turnover box lifting component 612. The turnover box lifting component 612 is located on the right side of the robot's forward direction and is driven by a lifting assembly 620 to raise and lower a turnover box 630. The turnover box 630 is capable of rotating on the turnover box lifting component 612.

The robotic arm lifting component 610 is located on the left side of the robot's forward direction, and is driven by the lifting assembly 620 to raise and lower the robotic arm (shown in FIG. 1). The lifting assembly 620 includes of a driving mechanism 622 and an execution mechanism 624. The driving mechanism 622 includes, but is not limited to, motors, cylinders, etc. The execution mechanism 624 includes, but is not limited to, any one of the synchronous belt pulley mechanism, chain wheel mechanism, gear rack mechanism, worm gear mechanism, and lifting screw mechanism.

The turnover box lifting component 612 includes a turnover box rotating body 640. The turnover box rotating body 640 includes a turnover box rotation drive component 642 and a turnover box telescopic component 644. The turnover box rotation drive component 642 includes a rotation drive mechanism 646 and a rotation execution mechanism 648. The rotation drive mechanism 646 is able to be implemented using a motor and a reducer that is mounted on the an output shaft of the motor. The rotation drive mechanism 646 drives the rotation execution mechanism 648 to rotate the turnover box rotating body 640. The turnover box telescopic component 644 is able to grip a turnover box 630, and to extend or retract the turnover box 630 to achieve the capture of the turnover boxes 630 on storage shelves and racks and placement on a support plate 158 of a support plate assembly 156 as shown in FIG. 1.

Figures 7, 8:
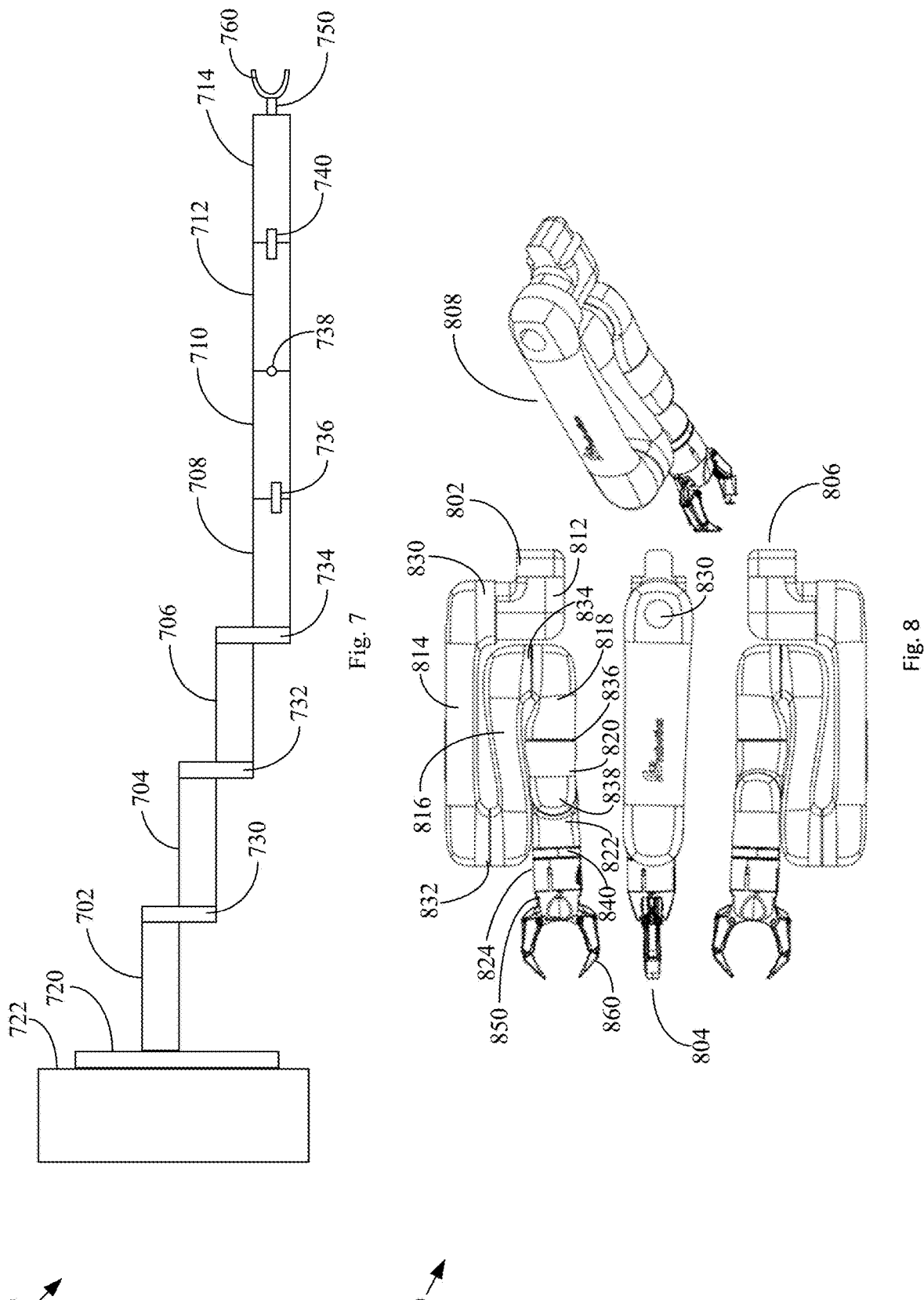
FIG. 7 illustrates a robotic arm assembly according to at least one embodiment.
FIG. 8 illustrates a robotic arm according to at least one embodiment.

FIG. 7 illustrates a robotic arm assembly 700 according to at least one embodiment.

In FIG. 7, the robotic arm assembly 700 includes L1 linkage 702, L2 linkage 704, L3 linkage 706, L4 linkage 708, L5 linkage 710, L6 linkage 712, and L7 linkage 714.

One end of the L1 linkage 702 is fixed to a lifting plate 720 on the of the robotic arm lifting component 722, and the other end is rotatably connected with one end of the L2 linkage 704 via first connection joint 730. The rotation axis of first connection joint 730 runs along the lifting direction of the robotic arm assembly 700. One end of the L3 linkage 706 is rotatably connected with the other end of the L2 linkage 704 via connection joint 732, and the rotation axis of connection joint 732 is parallel to the rotation axis of connection joint 730.

One end of the L4 linkage 708 is rotatably connected with the other end of the L3 linkage 706 via connection joint 734, and the rotation axis of connection joint 734 is parallel to the rotation axis of connection joint 732.

One end of the L5 linkage 710 is rotatably connected with the other end of the L4 linkage 708 via connection joint 736, and the rotation axis of connection joint 736 is perpendicular to the rotation axis of connection joint 734.

One end of the L6 linkage 712 is rotatably connected with the other end of the L5 linkage 710 via connection joint 738, and the rotation axis of connection joint 738 is perpendicular to the rotation axis of connection joint 736.

One end of the L7 linkage 714 is rotatably connected with the other end of the L6 linkage 712 via connection joint 740, and the rotation axis of connection joint 740 is perpendicular to the rotation axis of connection joint 738.

The output end of the L7 linkage 714 is a rotating shaft 750, and its rotation axis is perpendicular to the rotation axis of connection joint 740.

A gripper 760 is mounted on the rotating shaft 750 at the output end of the L7 link 714 and is used to pick up goods from a turnover box. The driving modes of the gripper 760 is able to be pneumatic or electric. A pneumatic gripper 760 is able to in the form of pneumatic suction cups, two-finger pneumatic grippers, three-finger pneumatic grippers, four-finger pneumatic grippers, etc. An electric gripper 760 is able to be in the form of two-finger electric grippers, three-finger electric grippers, four-finger electric grippers, etc. Under the lifting action of the robot arm lifting component 722, combined with the configuration of the robot arm 700, the gripper 760 is able to reach into smaller gaps to grab goods.

FIG. 8 illustrates a robotic arm 800 according to at least one embodiment.

In FIG. 8, a side view 802 of the robotic arm is 800 is shown. The robotic arm 800 includes L1 linkage 812, L2 linkage 814, L3 linkage 816, L4 linkage 818, L5 linkage 820, L6 linkage 822, and L7 linkage 824. The side view 802 of the robotic arm is 800 shows a first connection joint 830 between L1 Linkage 812 and L2 Linkage 814. The rotation axis of first connection joint 830 runs along the lifting direction of the robotic arm 800. One end of the L3 linkage 816 is rotatably connected with the other end of the L2 linkage 814 via connection joint 832, and the rotation axis of connection joint 832 is parallel to the rotation axis of connection joint 830.

One end of the L4 linkage 818 is rotatably connected with the other end of the L3 linkage 816 via connection joint 834, and the rotation axis of connection joint 834 is parallel to the rotation axis of connection joint 832.

One end of the L5 linkage 820 is rotatably connected with the other end of the L4 linkage 818 via connection joint 836, and the rotation axis of connection joint 836 is perpendicular to the rotation axis of connection joint 834.

One end of the L6 linkage 822 is rotatably connected with the other end of the L5 linkage 820 via connection joint 838, and the rotation axis of connection joint 838 is perpendicular to the rotation axis of connection joint 836.

One end of the L7 linkage 824 is rotatably connected with the other end of the L6 linkage 822 via connection joint 840, and the rotation axis of connection joint 840 is perpendicular to the rotation axis of connection joint 838.

The output end of the L7 linkage 824 is a rotating shaft 850, and its rotation axis is parallel to the rotation axis of connection joint 840.

A gripper 860 is mounted on the rotating shaft 850 at the output end of the L7 link 824 and is used to pick up goods from a turnover box. The driving modes of the gripper 860 is able to be pneumatic or electric. A pneumatic gripper 860 is able to in the form of pneumatic suction cups, two-finger pneumatic grippers, three-finger pneumatic grippers, four-finger pneumatic grippers, etc. An electric gripper 860 is able to be in the form of two-finger electric grippers, three-finger electric grippers, four-finger electric grippers, etc. Under the lifting action of the robot arm 800, combined with the configuration of the robot arm 800, the gripper 860 is able to reach into smaller gaps to grab goods.

Next, a top view 804 of the robotic arm is 800 is shown. The top view 804 of the robotic arm is 800 shows L3 Linkage 814, connection joint 830, and connection joint 832.

In FIG. 8, a reverse side view 806 of the robotic arm 800 is shown. Next, a perspective view 808 of the robotic arm 800 is shown.

Figure 9:
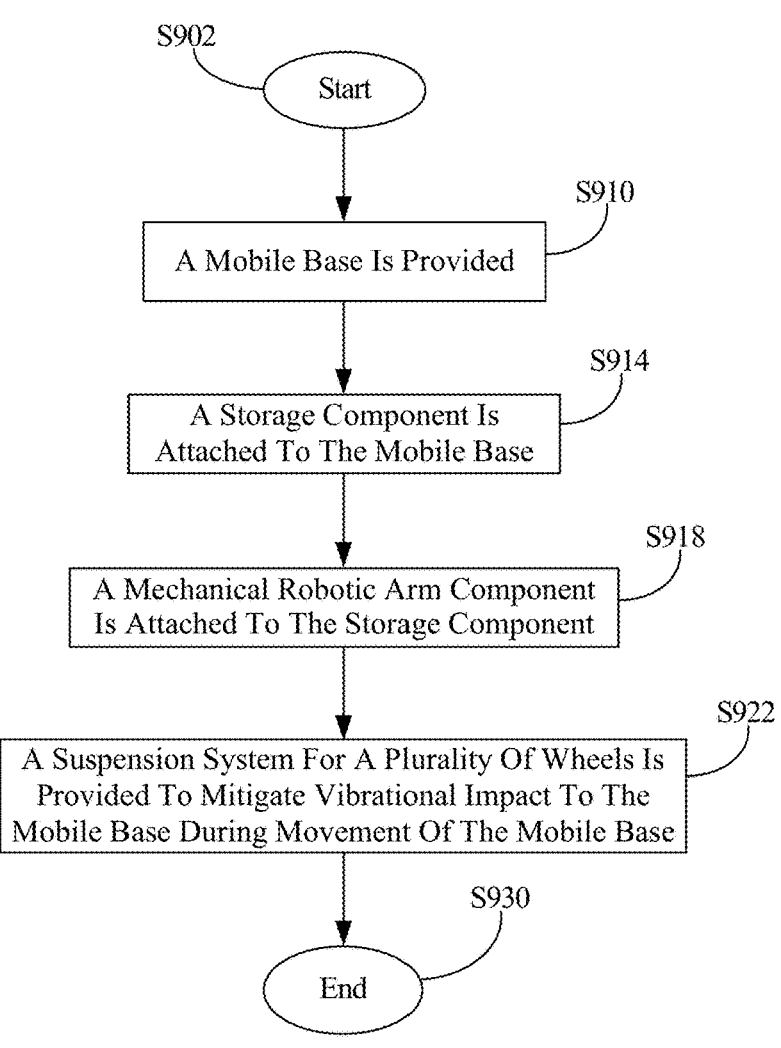
FIG. 9 illustrates method for providing an autonomous picking and transport robot according to at least one embodiment.

FIG. 9 illustrates method 900 for providing an autonomous picking and transport robot according to at least one embodiment.

In FIG. 9, the method begins S902 and a mobile base is provided S910. Referring to FIG. 1, the autonomous picking and transport robot 100 includes a mobile base 110. The mobile base 110 supports the storage component 150 and the mechanical robotic arm component 180. The mobile base 110 is used to drive the transport robot to move forward, backward, left, and right on the ground. The mobile base 110 includes a base plate 112 and a sensing device 114. The sensing device 114 acts as a navigation component and includes, at the front of the mobile base 110 on a symmetry axis 120, a LiDAR unit 116 and at least one RGBD camera unit 118, realizing the robot's mapping, positioning, navigation, and obstacle avoidance functions. A LiDAR unit is also able to be positioned at the back of the mobile base 110. The at least one RGBD camera unit 118 is able to include a first set of RGBD cameras 118 located at the front of the mobile base 110. The first set of 2 RGBD cameras 118 is symmetrically arranged on either side of the advancing direction and aligned with the symmetry axis 120. A second set (not shown) is able to be located at the rear of the mobile base 110 symmetrically placed on either side of the symmetry axis 120. The mobile base 110 further includes a collision avoidance component 122, and a fall prevention components (see fall prevention components 380, 382, 384, 386 in FIG. 3). The collision avoidance component 122 includes an anti-collision bar 124 and infrared sensors 126. In at least one embodiment, the anti-collision bar 124 is fixed to the front outer casing of the mobile base 110. An anti-collision bar (not shown) is also able to be fixed to the rear outer casing of the mobile base 110. The infrared sensors 126 and ultrasonic radar 128 are mounted on the robot's lateral direction, serving to supplement the visual blind spots when the robot is moving sideways. The ultrasonic radar 128 is used to detect ground with drop-offs, preventing the robot from tipping over.

A storage component is attached to the mobile base S914. Referring to FIG. 1, the autonomous picking and transport robot 100 includes a storage component 150. The storage component 150 is used for storing turnover boxes 152. The storage component 150 includes of side brackets 154 and a support plate assembly 156. In at least one embodiment, the side brackets 154 are hollow. A height of the support plate assembly 156 can be freely adjusted on the side brackets 154. To ensure that the turnover box 152 is accurately positioned during the pulling out and pushing in processes, and to prevent the turnover box 152 on the support plate assembly 156 from sliding off during operation, the support plate 158 of the support plate assembly 156 has corresponding slots 160 designed to align with the turnover box 152. For example, slots 160 are made on the support plate 158, while the bottom of the turnover box 152 includes shaped protrusions (not shown), and the slots 160 are designed to receive the shaped protrusions of the turnover box 152. Additionally, to ensure that the turnover box 152 is able to slide easily on shelves or support plate 158, the turnover box 152 is made of plastic material, possessing inherent self-lubricating properties.

A mechanical robotic arm component is attached to the storage component S918. Referring to FIG. 1, the autonomous picking and transport robot 100 includes a mechanical robotic arm component 180. The mechanical robotic arm component 180 includes an RGBD component 182. The Red-Green-Blue and Depth (RGBD) component 182 includes an RGBD component bracket 184 and at least two RGBD cameras 186, 187. The RGBD component bracket 184 is fixed on the side brackets 154 of the storage component 150 and moves up and down together with the robotic arm 188. A first RGBD camera 186 is oriented obliquely downward towards a tote 190 attached to the storage component 150 for holding the turnover box 152 obtained from the support plate 158 or from shelves, and its field of view (FOV) precisely covers the goods inside the tote 190. A second RGBD camera 187 is oriented outwards towards a shelf, and its field of view (FOV) precisely covers the goods inside a tote on the shelf (not shown). When the autonomous picking and transport robot 100 is in a non-working state, the robotic arm 188 is in the folded state as shown in FIG. 1. In the folded state as shown in FIG. 1, the robotic arm 188 is within the coverage area of the mobile base 110 to avoid the robot arm 188 from hitting people or objects during movement of the autonomous picking and transport robot 100. At the same time, the joints of the robotic arm 188 are equipped with braking devices to ensure that the robotic arm 188 will not fall in response to the autonomous picking and transport robot 100 losing power to thereby ensure safety. Referring to FIG. 7, the robotic arm assembly 700 includes L1 linkage 702, L2 linkage 704, L3 linkage 706, L4 linkage 708, L5 linkage 710, L6 linkage 712, and L7 linkage 714. One end of the L1 linkage 702 is fixed to a lifting plate 720 on the of the robotic arm lifting component 722, and the other end is rotatably connected with one end of the L2 linkage 704 via first connection joint 730. The rotation axis of first connection joint 730 runs along the lifting direction of the robotic arm assembly 700. One end of the L3 linkage 706 is rotatably connected with the other end of the L2 linkage 704 via connection joint 732, and the rotation axis of connection joint 732 is parallel to the rotation axis of connection joint 730. One end of the L4 linkage 708 is rotatably connected with the other end of the L3 linkage 706 via connection joint 734, and the rotation axis of connection joint 734 is parallel to the rotation axis of connection joint 732. One end of the L5 linkage 710 is rotatably connected with the other end of the L4 linkage 708 via connection joint 736, and the rotation axis of connection joint 736 is perpendicular to the rotation axis of connection joint 734. One end of the L6 linkage 712 is rotatably connected with the other end of the L5 linkage 710 via connection joint 738, and the rotation axis of connection joint 738 is perpendicular to the rotation axis of connection joint 736. One end of the L7 linkage 714 is rotatably connected with the other end of the L6 linkage 712 via connection joint 740, and the rotation axis of connection joint 740 is perpendicular to the rotation axis of connection joint 738. The output end of the L7 linkage 714 is a rotating shaft 750, and its rotation axis is perpendicular to the rotation axis of connection joint 740. A gripper 760 is mounted on the rotating shaft 750 at the output end of the L7 link 714 and is used to pick up goods from a turnover box. The driving modes of the gripper 760 is able to be pneumatic or electric. A pneumatic gripper 760 is able to in the form of pneumatic suction cups, two-finger pneumatic grippers, three-finger pneumatic grippers, four-finger pneumatic grippers, etc. An electric gripper 760 is able to be in the form of two-finger electric grippers, three-finger electric grippers, four-finger electric grippers, etc. Under the lifting action of the robot arm lifting component 722, combined with the configuration of the robot arm 700, the gripper 760 is able to reach into smaller gaps to grab goods.

A suspension system for a plurality of wheels is provided to mitigate vibrational impact to the mobile base during movement of the mobile base S922. Referring to FIG. 4, a first suspension system 440 includes the first drive wheel component 410, first passive wheel component 420, third passive wheel component 430, and first damping component 442. A second suspension system 450 includes the second drive wheel component 414, second passive wheel component 424, fourth passive wheel component 434 and second damping component 452. First suspension system 440 and second suspension system 450 serve to mitigate impacts during activities such as climbing slopes, overcoming obstacles, and crossing ditches. First drive wheel component 410 further includes a first fixed rod 460, a first swing rod 462, and the first drive wheel 411 mounted to the first swing rod 462. The first swing rod 462 is rotatably fixed to first fixed rod 460 at joint 464. Second drive wheel component 414 further includes a second fixed rod 466, a second swing rod 467, and the second drive wheel 415 mounted to the second swing rod 467. The second swing rod 467 is rotatably fixed to second fixed rod 467 at joint 468. First passive wheel component 420 further includes a third fixed rod 470, a third swing rod 472, and the first passive wheel 421 mounted to the third swing rod 472. The third swing rod 472 is rotatably fixed to the third fixed rod 470 at joint 474. Second passive wheel component 424 further includes a fourth fixed rod 474, a fourth swing rod 475, and the second passive wheel 425 mounted to the fourth swing rod 475. The fourth swing rod 475 is rotatably fixed to fourth fixed rod 474 at joint 477. The first damping component 442 is positioned between first drive wheel component 410 and the first fixed rod 470. First damping component 442 includes first damping rod 443 and a damping plate 444. One end 445 of the first damping rod 443 is fixedly mounted on the base plate 400 between the first drive wheel component 410 and the first fixed rod 460. The other end of the first damping rod 443 includes a groove 447. The damping plate 444 is fixed to the inner side of the groove 447 in the first damping rod 443, and the damping plate 444 acts to dampen vibration amplitude of third swing rod 472, which is coupled to the first drive wheel component 410 and first passive wheel 421. The second damping component 452 is positioned between second drive wheel component 410 and the second fixed rod 474. Second damping component 452 includes second damping rod 453 and a damping plate 454. One end 455 of the second damping rod 453 is fixedly mounted on the base plate 400 between the second drive wheel component 414 and the fourth fixed rod 474. The other end of the second damping rod 453 includes a groove 457. The damping plate 454 is fixed to the inner side of the groove 457 in the second damping rod 453, and the damping plate 454 acts to dampen vibration amplitude of the fourth swing rod 475, which is coupled to the first drive wheel component 410 and second passive wheel 425. In FIG. 4, one set of the damping components 442, 452 are shown. However, based on actual use, a second set of the damping components are able to be placed between the first drive wheel component 410 and the third fixed rod 470, and between the second drive wheel component and a fourth fixed rod 474.

Referring to FIG. 5, the first swing rod 514 is connected to the second swing rod 524 using a first compression spring 540. The first swing rod 514 is connected to the third swing rod 534 using a second compression spring 542.

The process then ends S930.

In at least one embodiment, An autonomous picking and transport robot includes a mobile base, a storage component, and a mechanical robotic arm component, wherein the mobile base includes a suspension system for mitigating vibrational impact to the mobile base during movement of the mobile base on the plurality of wheel. The suspension system incudes fixed rods and swing rods, wherein one of the plurality of wheels is attached to the each of the swing rods. Compression springs absorb shock of the swing rods. A damping component includes a damping rod and a damping plate, wherein the damping plate reduces a vibration amplitude of a swing rod positioned within the damping plate in response to at least one of the plurality of wheels encountering an obstacle during movement of the mobile base.

Embodiments described herein provide method that provides one or more advantages. For example, compared to the existing robots, embodiments described herein provide an autonomous picking and transport robot that allows for automated operation for picking up goods. Embodiments described herein provide fully automated operation of material handling robots, especially in warehousing environments with improved production efficiency.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. An autonomous picking and transport robot, comprising a mobile base; a storage component; and a mechanical robotic arm component, wherein the mobile base includes a suspension system for a plurality of wheels provided for locomotion, the suspension system mitigating vibrational impact to the mobile base during movement of the mobile base, wherein the suspension system further includes at least a first drive wheel component, the at least first drive wheel component includes: a first fixed rod attached to the mobile base; a first swing rod; and a first drive wheel of the plurality of wheels mounted on the first swing rod, wherein the first swing rod is rotatably attached to the first fixed rod at a first hinge position to enable the first drive wheel to swing about the first hinge position to reduce the vibrational impact to the mobile base in response to the first drive wheel encountering an obstacle during movement of the mobile base, and wherein the suspension system further includes at least one first passive wheel component, wherein the at least one first passive wheel component includes: a second fixed rod; a second swing rod; and a first passive wheel of the plurality of wheels mounted on the second swing rod, wherein the second fixed rod is attached to a front position of the mobile base between the first drive wheel and the first passive wheel, the second swing rod being rotatably attached to the second fixed rod at a second hinge position to enable the first passive wheel to swing about the second hinge position to reduce the vibrational impact to the mobile base in response to the first passive wheel encountering an obstacle during movement of the mobile base.

2. The autonomous picking and transport robot of claim 1, wherein the suspension system further includes a first damping component, wherein the first damping component includes a first damping rod and a first damping plate, wherein a first end of the first damping rod is fixedly mounted on the mobile base between the first drive wheel and the second fixed rod and a second end of the first damping rod including a first groove, the first damping plate fixed to sides of the first groove in the first damping rod to enable the first damping plate to clamp the second swing rod to reduce a vibration amplitude of the second swing rod in response to the first passive wheel encountering the obstacle during movement of the mobile base.

3. The autonomous picking and transport robot of claim 2, wherein the suspension system further includes at least one second passive wheel component, wherein the at least one second passive wheel component includes: a third fixed rod; a third swing rod; and a second passive wheel of the plurality of wheels attached to the third swing rod, wherein the third fixed rod is attached to a rear position of the mobile base between the first drive wheel and the second passive wheel, the third swing rod being rotatably attached to the third fixed rod at a third hinge position to enable the second passive wheel to swing about the third hinge position to reduce the vibrational impact to the mobile base in response to the second passive wheel encountering the obstacle during movement of the mobile base.

4. The autonomous picking and transport robot of claim 3, wherein the first swing rod is connected to the second swing rod by a first compression spring, and the first swing rod is connected to the third swing rod using a second compression spring.

5. The autonomous picking and transport robot of claim 3, wherein the suspension system further includes a second damping component located between the first drive wheel and the second fixed rod, wherein the second damping component includes a second damping rod and a second damping plate, wherein a first end of the second damping rod is fixedly mounted on the mobile base between the first drive wheel and the third fixed rod and a second end of the second damping rod including a second groove, the second damping plate fixed to the sides of the second groove in the second damping rod to enable the second damping plate to clamp the third swing rod to reduce a vibration amplitude of the third swing rod in response to the second passive wheel encountering the obstacle during movement of the mobile base.

6. The autonomous picking and transport robot of claim 1, wherein the mechanical robotic arm component includes a robotic arm, wherein the robotic arm includes: a lifting plate attached to a robotic arm lifting component, a first linkage, a second linkage, a third linkage, a fourth linkage, a fifth linkage, a sixth linkage, and a seventh linkage; a first end of the first linkage is fixed to the lifting plate of the robotic arm lifting component and a second end of the first linkage is rotatably connected to a first end of the second linkage by a first joint having a first rotation axis running along a lifting direction of the robotic arm component; a first end of the third linkage is rotatably connected with a second end of the second linkage by a second joint having a second rotation axis parallel to the first rotation axis of the first joint; a first end of the fourth linkage is rotatably connected with a second end of the third linkage by a third joint having a third rotation axis parallel to the second rotation axis of the second joint; a first end of the fifth linkage is rotatably connected with a second end of the fourth linkage by a fourth joint having a fourth rotation axis perpendicular to the third rotation axis of the third joint; a first end of the sixth linkage is rotatably connected with a second end of the fifth linkage by a fifth joint having a fifth rotation axis perpendicular to the fourth rotation axis of the fourth joint; a first end of the seventh linkage is rotatably connected with a second end of the sixth linkage by a sixth joint having a sixth rotation axis perpendicular to the fifth rotation axis of the fifth joint; and a second end of the seventh linkage having a rotating shaft having a seventh rotation axis perpendicular to the sixth rotation axis of the sixth joint.

7. The autonomous picking and transport robot of claim 1, wherein the storage component includes a tote for holding a turnover box, and wherein the mechanical robotic arm component includes at least two Red-Green-Blue and Depth (RGBD) cameras, wherein a first of the at least two RGBD cameras is oriented obliquely downward towards the tote with a field of view (FOV) covering contents within the tote, and a second of the at least two RGBD cameras is oriented outward with a FOV covering goods on a shelf.

8. The autonomous picking and transport robot of claim 1, wherein the storage component further includes vertical side brackets; at least one support plate assembly adjustably attached to the vertical side brackets of the storage component; and a tote attached to the storage component for holding a turnover box for placement on the at least one support plate.

9. The autonomous picking and transport robot of claim 1, wherein the mobile base further includes a sensing device for providing mapping, positioning, navigation, and obstacle avoidance functions during movement of the mobile base.

10. A method for providing an autonomous picking and transport robot, comprising providing a mobile base; providing a storage component attached to the mobile base; providing a mechanical robotic arm component attached to the storage component; and, providing a suspension system for a plurality of wheels used to enable the mobile base to move, wherein the suspension system mitigates vibrational impact to the mobile base during movement of the mobile base, wherein the providing the suspension system further includes providing at least a first drive wheel component, the providing the at least first drive wheel component includes: providing a first fixed rod attached to the mobile base: providing a first swing rod rotatably attached to the first fixed rod at a first hinge position; and providing a first drive wheel of the plurality of wheels mounted on the first swing rod, wherein the first swing rod enables the first drive wheel to swing about the first hinge position to reduce the vibrational impact to the mobile base in response to the first drive wheel encountering an obstacle during movement of the mobile base, and wherein the providing suspension system further includes providing at least one first passive wheel component, wherein the providing the at least one first passive wheel component includes: providing a second fixed rod; providing a second swing rod rotatably attached to the second fixed rod at a second hinge position; and providing a first passive wheel of the plurality of wheels mounted on the second swing rod, wherein the second swing rod enables the first passive wheel to swing about the second hinge position to reduce the vibrational impact to the mobile base in response to the first passive wheel encountering an obstacle during movement of the mobile base.

11. The method of claim 10, wherein the providing the suspension system further includes: providing a first damping component including a first damping rod, a first end of the first damping rod fixedly mounted on the mobile base between the first drive wheel and the second fixed rod, a second end of the first damping rod having a first groove; and providing a first damping plate fixed to sides of the first groove in the first damping rod to enable the first damping plate to clamp the second swing rod to reduce a vibration amplitude of the second swing rod in response to the first passive wheel encountering the obstacle during movement of the mobile base.

12. The method of claim 11, wherein the providing the suspension system further includes providing at least one second passive wheel component, wherein the providing the at least one second passive wheel component includes: providing a third fixed rod attached to a rear position of the mobile base between the first drive wheel and the second passive wheel; providing a third swing rod rotatably attached to the third fixed rod at a third hinge position; and providing a second passive wheel of the plurality of wheels mounted on the third swing rod, wherein the third swing rod enables the second passive wheel to swing about the third hinge position to reduce the vibrational impact to the mobile base in response to the second passive wheel encountering the obstacle during movement of the mobile base.

13. The method of claim 12, wherein the providing the first swing rod includes connecting the first swing rod to the second swing rod with a first compression spring, and connecting the first swing rod to the third swing rod with a second compression spring.

14. The method of claim 12, wherein the providing suspension system further includes providing a second damping component including a second damping rod, a first end of the second damping rod fixedly mounted on the mobile base between the first drive wheel and the second fixed rod, a second end of the second damping rod having a second groove; and providing a second damping plate fixed to the sides of the second groove in the second damping rod to enable the second damping plate to clamp the third swing rod to reduce a vibration amplitude of the third swing rod in response to the second passive wheel encountering the obstacle during movement of the mobile base.

15. The method of claim 10, wherein the providing the storage component further includes: providing vertical side brackets; providing at least one support plate assembly adjustably attached to the vertical side brackets of the storage component; and providing a tote attached to the storage component for holding a turnover box for placement on the at least one support plate.

16. The method of claim 10, wherein the providing the mobile base further includes providing a sensing device for providing mapping, positioning, navigation, and obstacle avoidance functions during movement of the mobile base.

* * * * *